July 22, 1930.  J. H. WAGENHORST  1,771,363
DROP BASE RIM WITH FILLERS
Filed Nov. 24, 1924  2 Sheets-Sheet 1
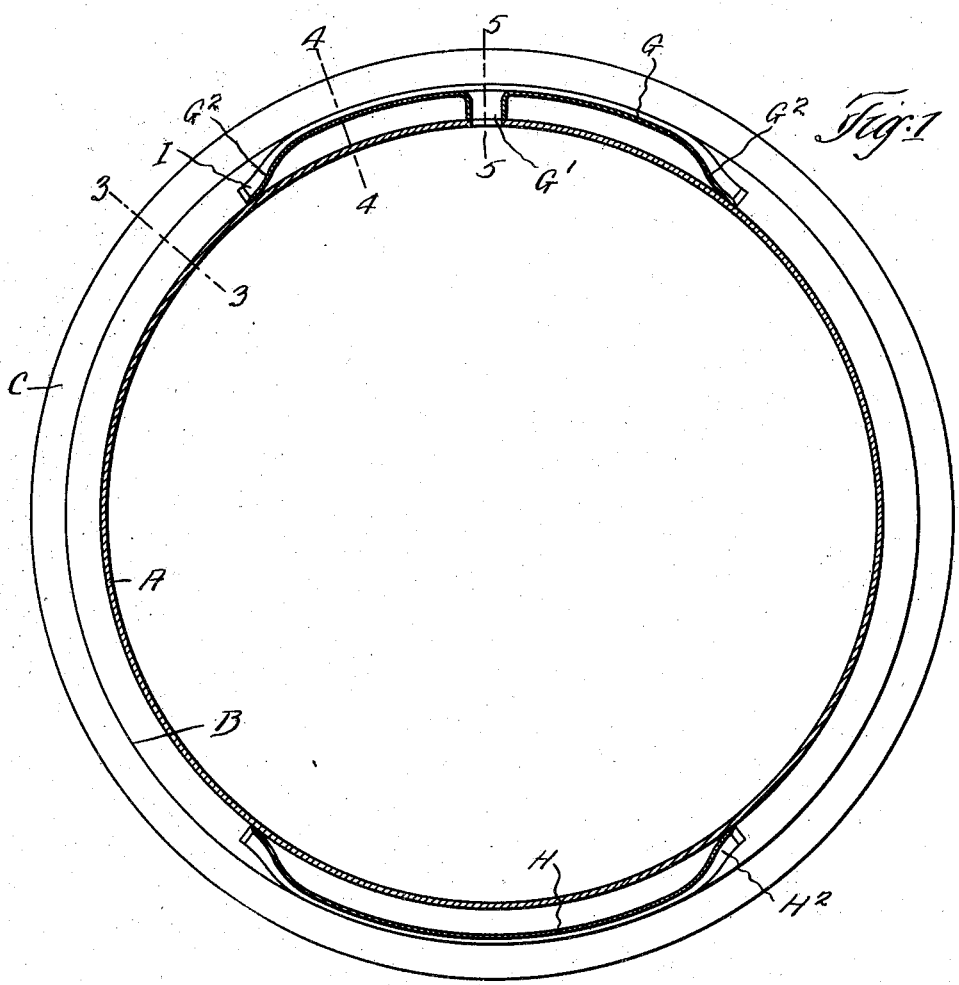
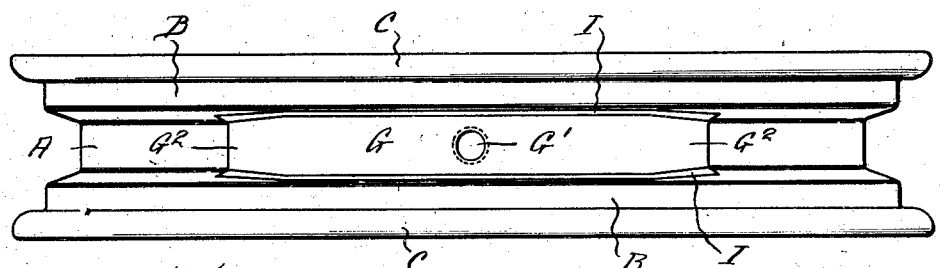

July 22, 1930.  J. H. WAGENHORST  1,771,363
DROP BASE RIM WITH FILLERS
Filed Nov. 24, 1924   2 Sheets-Sheet 2
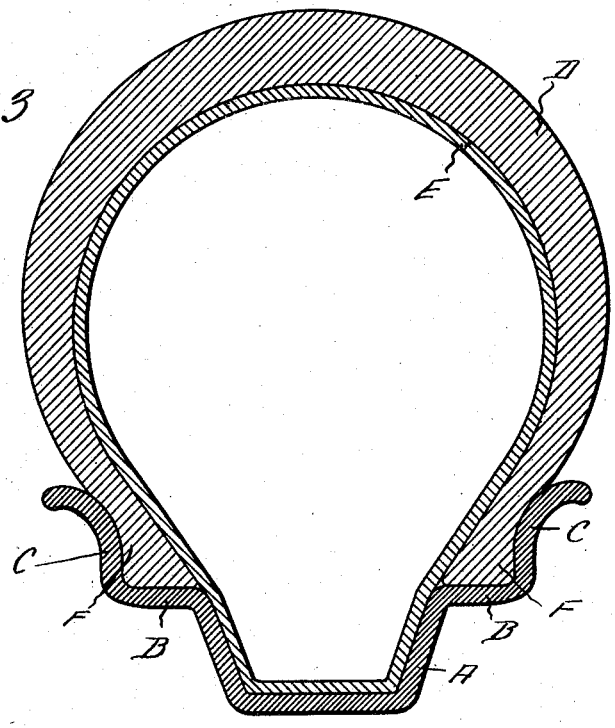
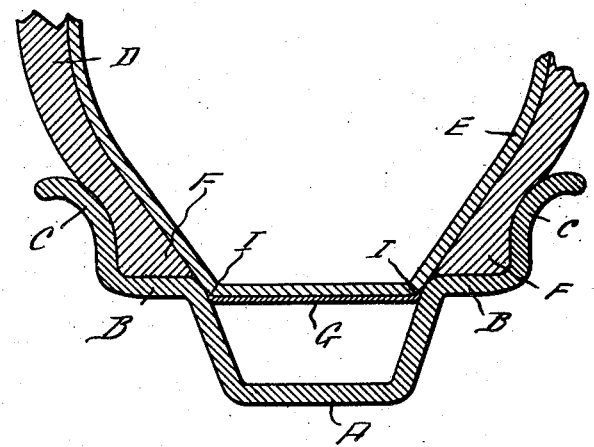
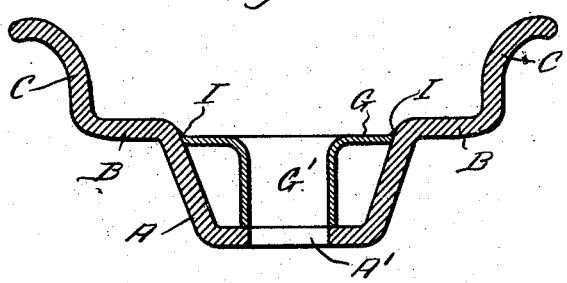

Patented July 22, 1930

1,771,363

UNITED STATES PATENT OFFICE

JAMES H. WAGENHORST, OF JACKSON, MICHIGAN

DROP-BASE RIM WITH FILLERS

Application filed November 24, 1924. Serial No. 751,791.

This invention relates generally to automobile tire rims and more particularly to rims intended for use in connection with balloon tires.

The invention is also in the nature of an improvement upon the rim shown and described in my Patent No. 1,551,445, dated August 25, 1925.

Rims of this particular type are designated drop base rims because the central portion of the rim base is dropped or extended radially inwardly, and upon each side of this central inwardly projecting portion there are provided seats for the beads of the tire which terminate or carry at opposite sides, the tire engaging flanges.

When a tire is arranged on the rim and inflated, the bead portions will rest on their seats and the inner tube will fit into the inwardly extending portion of the rim base. In case of sudden deflation of the tire there is danger of the tire beads being forced down into the drop base portion at one side and throwing the bead off the rim at the opposite side.

Furthermore, in removing the tire from a rim of this kind there is danger of injuring the inner tube when a screw driver or other form of tire tool is forced under the bead at one side, unless some provision be made to protect the adjacent portion of the inner tube from such injury.

In my application hereinbefore referred to, I employ a filler which occupies a part of the drop base portion of the rim, which filler permits a screw driver or other form of tool to be introduced under the bead of the tire without injury to the inner tube.

The object of the present invention is not only to provide a filler for the purpose of protecting the inner tube, but also to prevent the accidental displacement of the tire from the rim; and these objects I accomplish by employing two sections of filler, one at the valve stem hole and the other portion substantially opposite the valve stem hole, these fillers being arranged within the drop base portion of the felly and substantially flush with the bead seating portions of the rim so that the screw driver or tire tool can be pushed under both bead and inner tube without injury to the inner tube.

By employing two sections of filler at substantially diametrically opposite points, I practically render it impossible to accidently displace the rim during deflation, inasmuch as it is necessary to project the tire at opposite sides into the drop base portion of the rim in order to remove the tire at the intermediate points, and it will be practically impossible for oppositely disposed portions of the tire to be pushed into the drop base portion of the rim at one and the same time while the tire is in motion and under deflation.

The invention consists also in certain details of construction all of which will be fully described and set forth in the appended claim.

In the drawings forming a part of this specification, Fig. 1 is a vertical longitudinal sectional view of a rim constructed in accordance with my invention; Fig. 2 is a top plan view of the same; Fig. 3 is a sectional view of a rim taken on the line 3—3 of Fig. 1, with the tire shown therein; Fig. 4 is a section taken on the line 4—4 of Fig. 1 and Fig. 5 is a section taken on the line 5—5 of Fig. 1, the tire being omitted.

In the practical embodiment of my invention I employ a sheet metal rim which is preferably continuous and is rolled with a central inwardly projecting portion A, oppositely disposed bead seating portions B at each side of the central drop base portion and the integral tire engaging flanges C. In normal use this rim is adapted to be used in connection with balloon tires embodying the outer casing or shoe D and the inner tube E, the shoe having bead portions F which are held upon the bead seats when the inner tube is inflated, and the inner portion of this inner tube rests in the drop base portion of the rim. This type of rim, however, can be used for other tires besides balloon tires.

A tire constructed in this manner can be attached to either a wooden or metal wheel body, and the metal wheel body may be either spoke or disk; and, while a rim of this character is usually permanently connected to the wheel body, it could, of course, be a demountable rim, if desired.

At oppositely disposed points, preferably at the valve stem hole and at a point opposite thereto, I arrange fillers G and H, which are substantially similar except that the filler G is formed with a tubular portion G' through which the valve stem is passed, this tubular portion G' coinciding with the valve stem opening A' in the base of the rim.

The fillers G and H are preferably made of thin sheet metal and are arranged, as before stated, at opposite points and within the drop base portion of the rim, the filler being of sufficient width to extend from one side wall of the drop base portion to the opposite side wall and its outer edges are flanged and tapered, as indicated at I, in order to provide a smooth joint between the edges of the filler and the walls of the rim.

It will be noted that the filler is substantially flush with the bead seats but is slightly inside of the true line extending across between the seats, but it is so nearly flush with the said bead seats that a screw driver or other form of tire tool can be readily inserted under the bead and under the adjacent portion of the inner tube without injuring said inner tube. It will also be noted that the opposite ends of the fillers are curved inwardly, as indicated at G² and H² until they contact with the central portion of the rim, as most clearly shown in Figs. 1 and 2.

The fillers are preferably welded to the rim base, and the flanges I, provide convenient points for such operations. This welding can be either electric or flame welding, as preferred.

In the application of tires to the rim, or in the removal thereof from the rim, the operator can force the tool between the beads of the tire and filler and work the portions of the tire on either or both sides of the filler into the unfilled drop base portions and thereby remove the same from the rim or replace it.

By having the fillers within the rim at diametrically opposite points, all danger of the tire becoming accidentally thrown off the rim while under deflation and in motion is removed, because, while in motion, it will be impossible to simultaneously force the rim beads into the unfilled drop base portions at diametrically opposite points.

When the wheel rim is not in motion, however, the tire can be quickly and easily applied or removed by the usual manipulations of the standard type of tire tool, inasmuch as said tool can be introduced beneath the bead and inner tube at the points where the fillers are employed and at the same time the beads at one or two points 90° removed can be pushed into the drop base of the rim. Were fillers not provided it would be very dangerous to introduce a tire tool beneath the bead because of probability of injuring the inner tube which would be resting in the drop base of the rim and no means provided for lifting the same.

Having thus described my invention, what I claim is:

A tire carrying rim having a central drop base portion, and a plurality of spaced fillers arranged in said drop base portion, each filler having outwardly extending side flanges contacting with the side walls of the drop base portion.

In testimony whereof, I hereunto affix my signature.

JAMES H. WAGENHORST.